UNITED STATES PATENT OFFICE.

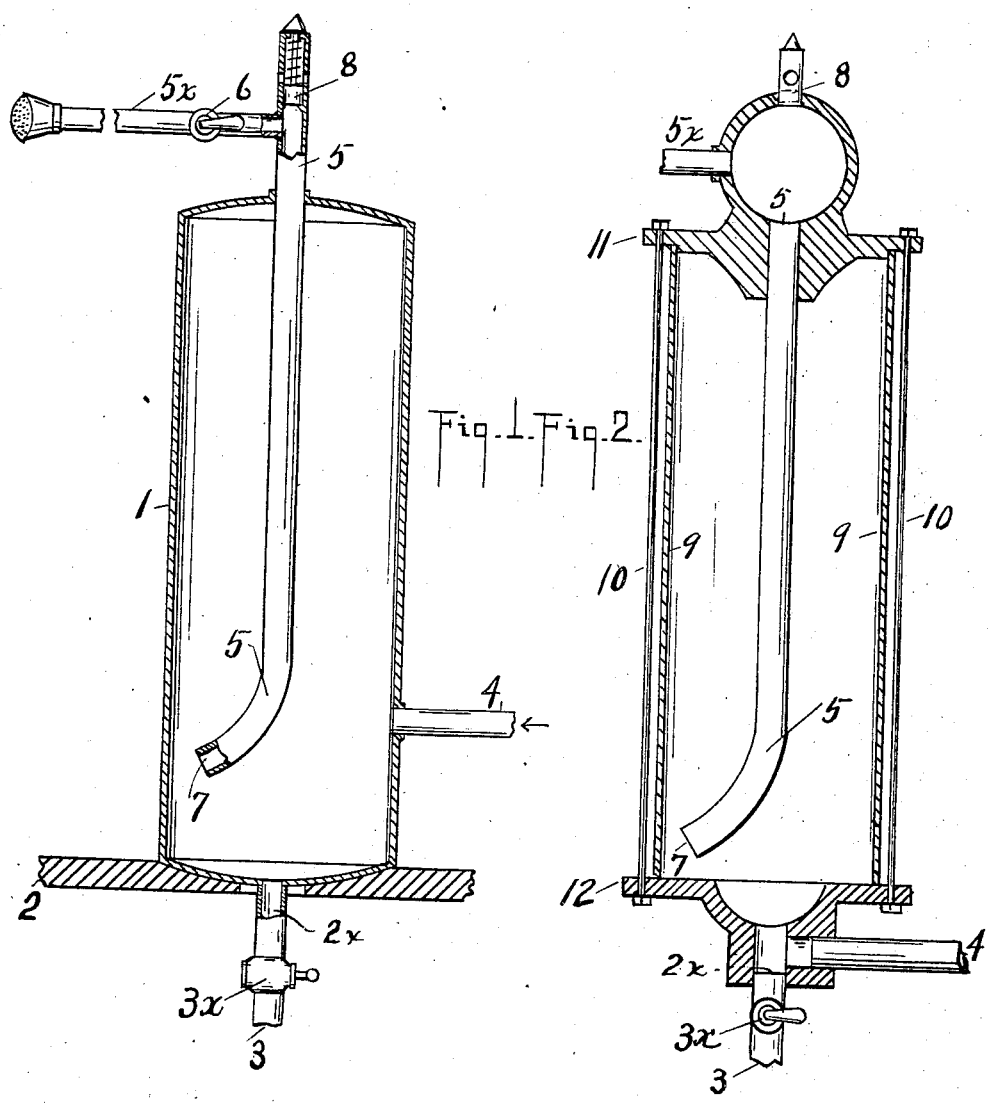

ADELBERT M. PHILLIPS, OF LE ROY, NEW YORK, ASSIGNOR TO LE ROY PLOW COMPANY, OF LE ROY, NEW YORK, A CORPORATION OF NEW YORK.

SPRAYING DEVICE.

No. 896,148.　　　Specification of Letters Patent.　　　Patented Aug. 18, 1908.

Application filed April 20, 1907. Serial No. 369,409.

*To all whom it may concern:*

Be it known that I, ADELBERT M. PHILLIPS, a resident of Le Roy, in the county of Genesee and State of New York, have invented certain new and useful Improvements in Spraying Devices; and I do hereby declare the following to be a full, clear, and exact description of the invention, such as will enable others skilled in the art to which it pertains to make and use the same.

This application relates to apparatus for spraying liquids, and has for its object to increase the efficiency of such apparatus, and to simplify and cheapen its construction.

The invention consists in the construction hereinafter described and particularly pointed out.

In the accompanying drawing which illustrates the invention—Figure 1 is a central section of a tank or receptacle provided with adjuncts suited for the purpose of supplying liquid to a spraying nozzle; Fig. 2 is a similar view of a modified form.

In operation a liquid is forced through the tank, and to and through a nozzle, rose, or other delivering terminal, as usual in spraying machines. Said terminal may be of any approved form, and as its particular character constitutes no part of the improvement it is not illustrated in detail.

It is a practice to convey the spraying apparatus, including one or more receptacles for liquid, on a vehicle among the trees, plants or objects to be treated but the present improvement is not limited to use on a vehicle.

Referring to the drawing, numeral 1 denotes a tank or the like, shown as supported on a base 2, and provided with a draw-off or blow-off pipe 3.

A valve is denoted by $3^\times$.

4 indicates an inlet pipe through which the tank may be charged in manner well known.

5 denotes a discharge pipe. This is provided, preferably outside the tank, with a branch or continuation $5^\times$ for discharge of the liquid. A valve 6 is provided in this pipe substantially as indicated. The pipe 5 extends nearly the whole length of the tank and is preferably situated centrally within the same. Its lower end is curved or bent substantially as shown, and its open end 7 thereby diverted away from the inlet which by preference is situated above the mouth of the discharge pipe and adapted to deliver liquid transversely to the general direction of pipe 5. By this construction the passage of liquid directly into the discharge pipe thereby carrying into it any sedimentary matter in the liquid to be sprayed is avoided.

Since in operation the tank has no normal outlet except through the pipe 5, when the mouth of said pipe is sealed by liquid there is a dead air space above in which air will be compressed by liquid forced in at 4. This air compression acts upon the liquid surface below and forces its discharge whenever a free outlet through said pipe 5 is permitted.

The device is adapted for spraying any suitable liquid, such as the well known Bordeaux mixture, or any liquid mixture containing substances such as copper sulfate, lime, paris green, or the like, and water. And it is primarily intended for spraying fruit trees, grape vines, potatoes, beans, and other trees, vines and crops. As these liquids usually contain sedimentary matter it is preferred that the inlet to the tank be above that of pipe 5, and these are so arranged as to provide below them a space $2^\times$ for such sediment, which from time to time can be removed by opening the valve $3^\times$, and by forcing in fresh liquid through pipe 4 if necessary to expedite its removal.

As the tank set forth contemplates the introduction of liquid under pressure which may be variable and may rise above a convenient limit, a safety valve 8 is supplied conveniently in direct communication with the discharge pipe 5 as represented. As indicated in Fig. 2, the liquid receptacle may if desired be formed by a cylinder 9, held by bolts 10 between the heads 11 and 12. These will be provided with an inlet and with outlets and a safety valve, substantially as set forth in connection with Fig. 1.

Having described the invention what I claim is—

1. For delivering liquids to a spraying nozzle, a liquid receptacle, an outlet pipe situated centrally in the receptacle and extending above the same, said extension communicating directly with the outer atmosphere through perforations therein, a branch outlet pipe below said perforations, a safety valve situated in the outlet pipe extension adjacent and immediately over said branch, a sediment holder below the side walls of the receptacle, and a sediment delivering valve below said holder.

2. For delivering liquids to a spraying nozzle, a liquid receptacle, an outlet pipe situated centrally in the receptacle and extending above the same, a sediment holder below the side walls of the receptacle, a sediment discharging valve below said holder, said outlet pipe having its intake end turned to near one side of the receptacle, and a supply pipe situated in the opposite side of the receptacle, said intake being situated in a plane oblique to the axes of the inlet and outlet pipes.

3. For delivering liquids to a spraying nozzle, a liquid receptacle, a supply pipe, an outlet pipe extending above the receptacle, a sediment holder below the side walls of the receptacle, a sediment delivering valve below said holder, said outlet pipe having its intake end turned to near one side of the receptacle and directed away from the supply pipe.

4. For spraying liquids, a liquid receptacle, a spraying nozzle, an inlet pipe, and an outlet pipe extending from near the bottom of the receptacle to its top, and having near the bottom of the receptacle an intake opening directed away from the ends of the receptacle and situated in a plane oblique to the axes of the inlet and outlet pipes.

In testimony whereof, I have signed this specification in the presence of two subscribing witnesses.

ADELBERT M. PHILLIPS.

Witnesses:
WILLIS H. BALDWIN,
THOMAS W. LARKIN.